(12) United States Patent
Pluemer et al.

(10) Patent No.: US 9,889,589 B1
(45) Date of Patent: Feb. 13, 2018

(54) APPARATUS AND METHOD OF MANUFACTURING AND LABELING PLASTIC WARES

(71) Applicant: Amscan Custom Injection Molding, LLC, Elmsford, NY (US)

(72) Inventors: Steve Pluemer, Albuquerque, NM (US); Greg Pluemer, Albuquerque, NM (US)

(73) Assignee: AMSCAN CUSTOM INJECTION MOLDING, LLC, Elmsford, NY (US)

(*) Notice: Subject to any disclaimer, the term of this patent is extended or adjusted under 35 U.S.C. 154(b) by 1148 days.

(21) Appl. No.: 13/969,424

(22) Filed: Aug. 16, 2013

Related U.S. Application Data

(60) Provisional application No. 61/683,929, filed on Aug. 16, 2012.

(51) Int. Cl.
*B29C 45/00* (2006.01)
*B29C 45/16* (2006.01)
*B32B 7/04* (2006.01)

(52) U.S. Cl.
CPC ............ *B29C 45/1671* (2013.01); *B32B 7/04* (2013.01)

(58) Field of Classification Search
CPC .......... B29C 2045/14918; B29C 33/12; B29C 33/14
USPC ........................................................ 264/509
See application file for complete search history.

(56) References Cited

U.S. PATENT DOCUMENTS

| | | | |
|---|---|---|---|
| 2,092,456 A | 9/1937 | Hunker | |
| 2,781,959 A | 2/1957 | Loveland | |
| 2,874,835 A | 2/1959 | Poupitch | |
| 2,949,203 A | 8/1960 | Berg | |
| 3,682,352 A | 8/1972 | Doucette | |
| 3,738,525 A | 6/1973 | Knapp | |
| 3,884,354 A | 5/1975 | Guenther et al. | |
| 3,924,738 A | 12/1975 | Poupitch | |
| 4,481,163 A * | 11/1984 | Ota | B29C 49/0073 215/382 |
| 4,802,295 A * | 2/1989 | Darr | B29C 49/24 215/12.2 |
| 4,850,479 A | 7/1989 | Bird | |
| 6,644,540 B2 | 11/2003 | Jamitzky et al. | |
| 6,715,810 B2 | 4/2004 | Borg | |
| 7,100,762 B2 | 9/2006 | Marco | |
| 2007/0042144 A1* | 2/2007 | Teensma | B29C 33/14 428/34.2 |
| 2011/0169192 A1* | 7/2011 | Houdeshell | B29C 31/008 264/275 |
| 2011/0189397 A1* | 8/2011 | Langstaff | B29C 45/14688 427/256 |
| 2011/0272316 A1* | 11/2011 | Barange | B29C 33/444 206/459.5 |

\* cited by examiner

*Primary Examiner* — Christina Johnson
*Assistant Examiner* — Xue Liu
(74) *Attorney, Agent, or Firm* — Leason Ellis LLP

(57) ABSTRACT

An apparatus and method of manufacturing and labeling plastic wares comprising durable acrylic labels that are integrated into a surface of the plastic wares.

15 Claims, 8 Drawing Sheets

APPARATUS AND METHOD OF MANUFACTURING AND LABELING PLASTIC WARES

CROSS-REFERENCE TO RELATED APPLICATIONS

This application claims priority to and the benefit of the filing of U.S. Provisional Patent Application Ser. No. 61/683,929, entitled "APPARATUS AND METHOD OF MANUFACTURING AND LABELING PLASTIC GOODS", filed on Aug. 16, 2012, and the specification and claims thereof are incorporated herein by reference.

BACKGROUND OF THE INVENTION

Field of the Invention (Technical Field)

Embodiments of the present invention relate to methods and apparatuses for manufacturing and labeling plastic goods, and more particularly to plastic goods that are molded with one or more labels, e.g., acrylic labels.

DESCRIPTION OF RELATED ART

Plastic wares comprising acrylic film labels are ubiquitous today. When the wares are disposable, it is irrelevant whether or not the labels remain affixed to the plastic ware. However, some plastic wares are manufactured for more than one use, e.g., plastic cups comprising art work. When that is the case, a durable label is preferable so that the life of the product, as a whole, is extended. Film labels that are not durable can fall off after normal use of the plastic ware, for example, after the ware is ran through the dishwasher. In some cases, the label remains in place for a long time, but the art work printed on the label fades or is scratched off, affecting the appearance and appeal of the plastic ware.

Embodiments of the present invention solve this problem by providing methods to manufacture plastic wares comprising durable labels, e.g., labels that protect materials printed on them, and plastic wares comprising exterior surfaces that protect labels.

BRIEF SUMMARY OF THE INVENTION

Embodiments of the present invention comprise methods of manufacturing and labeling plastic wares comprising the steps of providing a mold comprising a cavity component and a core component, disposing a label in a gap between the cavity component and the core component so that the label is disposed against an inside surface of the cavity component, injecting melted plastic into the gap between the core component and the label, solidifying the melted plastic to form the plastic ware, and incorporating the label into the outer surface of the plastic ware. One embodiment further comprises the step of treating the inside surface of the cavity component to add texture, for example through acid etching and/or sandblasting. Optionally the texture comprises dimples that form bumps on the outer surface of the plastic ware. For example, the bumps are about 1 mm in diameter and are about 5 mm apart from each other. One embodiment further comprises the step of polishing the outside surface of the core component. One embodiment further comprises melting plastic pellets to create the melted plastic. A preferred embodiment comprises printing art work on the inside surface of the label so that ink comprising the art work is in direct contact with the plastic, optionally through reverse printing, and preferably with ink that is heat resistant. Preferably the label is clear. In a different embodiment, the printing of the art work is done on the outer surface of the label. Preferably the plastic is clear or transparent when the plastic wares are finished. One embodiment comprises straight printing art work on an inside surface of the label. One embodiment further comprises the step of cooling the mold prior to the injecting step. Embodiments of the present invention also comprise a plastic ware manufactured and labeled according to the methods of embodiments of the present invention.

Further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DETAILED DESCRIPTION OF THE INVENTION

As used herein, "plastic goods" or "plastic wares" include but are not limited to flatware, utensils, plates, cups, mugs, drink cups, buckets, trays, containers, storage bins, scoops, measuring devices, bowls, overcaps, tubes, saucers, bins, lids, handles, bags, bottles, cans, canisters, food pan, waste receptacle, boxes, cylinders, spheres, balls, toys, tools, name plates, accessories, pencil cases, folders, pitchers, sports equipment, hunting equipment, fishing equipment, firearms, clubs, rackets, sports balls, helmets, placemats, mouse pads, measuring spoons, etc.

The embodiments of the present invention do not require adhesives, vacuum, ink, paint, static charges or any other types of charging for disposing a label on a finished plastic good. Thus, the methods of this embodiment have the advantage of not requiring adhesives or static charges to position the label. The label can be, but is not limited to, styrene acrylonitrile (SAN), polypropylene, combinations thereof and the like. The label preferably comprises two surfaces or layers. An outer surface is disposed on the outside of the plastic good. An inner surface contacts the finished plastic good. In one embodiment, the inner surface is the surface that the art work of the label is printed on, i.e., the layer or surface having the ink, or similar means for marking the plastic good, such as other forms of dye or pigmentation and the outer surface is a protective surface for the ink on the label.

Figure 1:
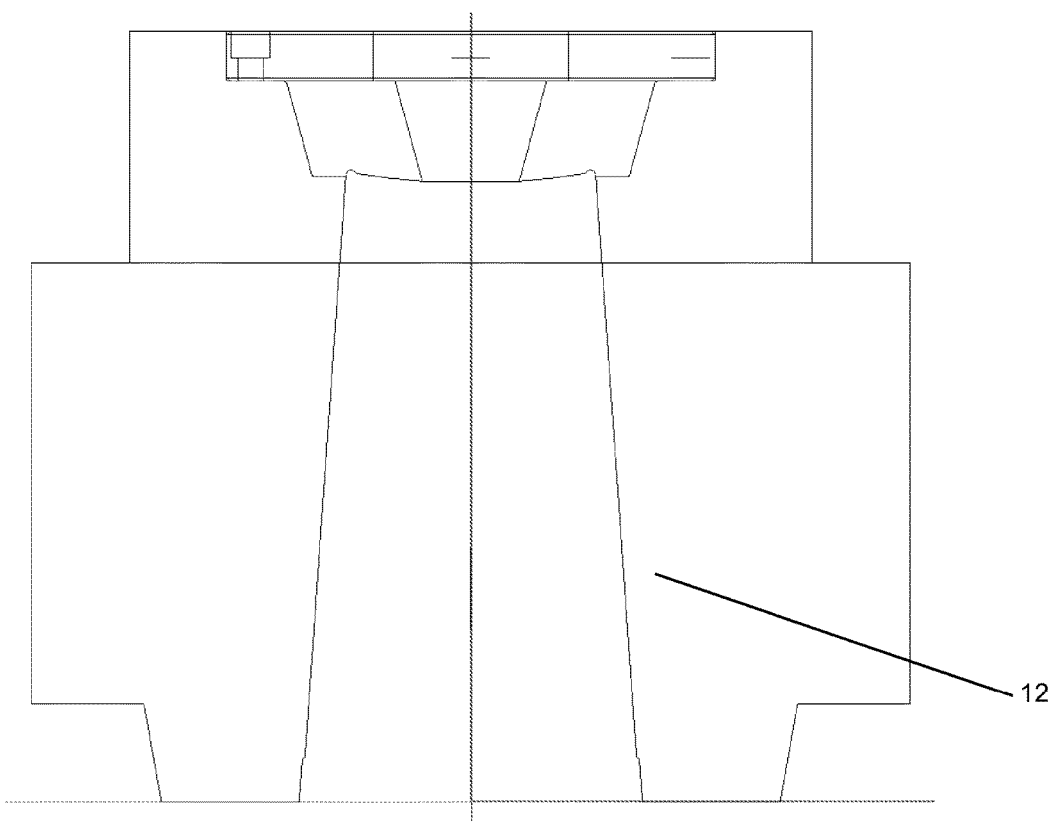
FIG. 1 is a front view of an example of a cavity component of a mold.
Figure 2:
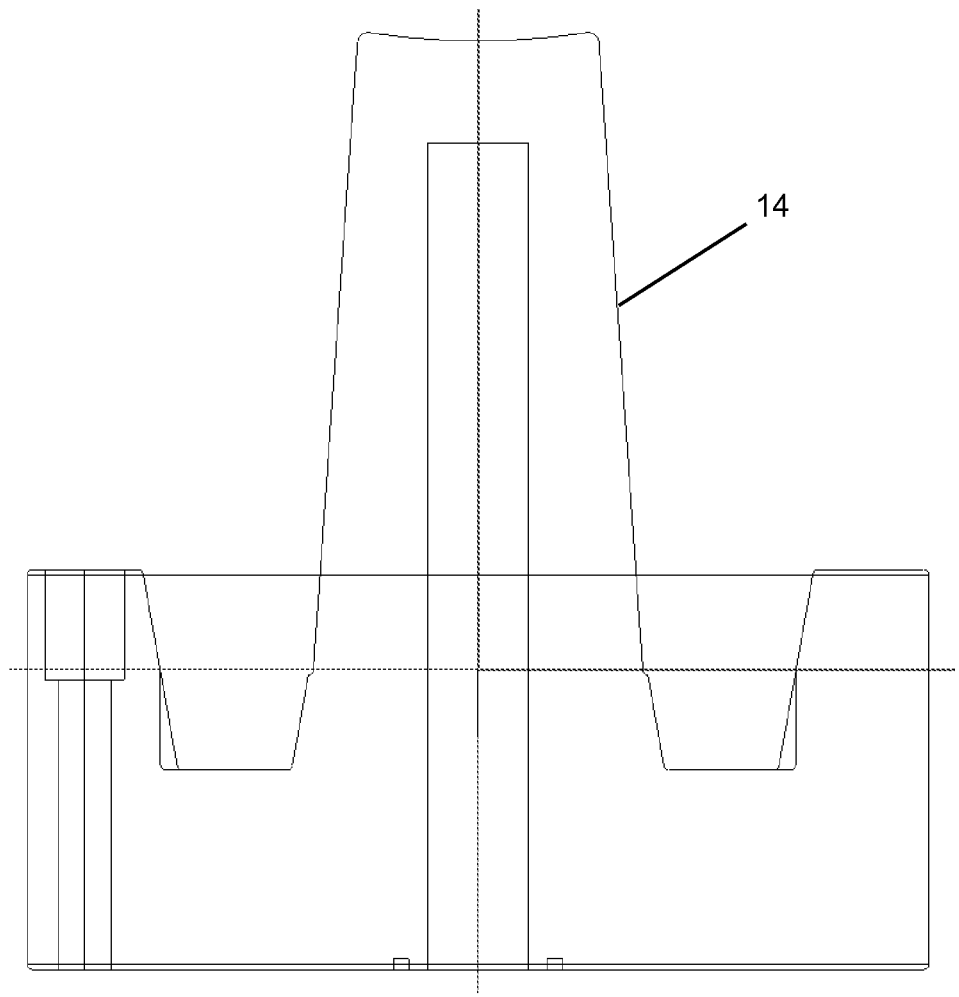
FIG. 2 is a front view of an example of a core component of a mold.

One embodiment of the present invention comprises a method of manufacturing and labeling one or more plastic goods. The method comprises specifying, designing and building a mold to the predetermined specifications for the plastic good to be manufactured. The mold preferably comprises at least two components, e.g., a cavity and a core. FIGS. 1 and 2 show an example of cavity component 12 and core component 14 respectively. The portion of the cavity component that forms the outer surface of the plastic good that is molded is preferably treated to add appropriate texture to the final product. This treatment assists in securing a label in the cavity. One type of texture is, for example, a series of small holes or dimples that result in small bumps on the outer surface of the plastic good. The treatment can comprise, but is not limited to, sandblasting, etching, blasting with a material different than sand, combinations thereof and the like. The treatment, for example, sandblasting, is preferably performed at room temperature and comprises a fine grit (e.g., between about 80 to about 400 grit and preferably between about 120 to about 200 grit and most preferably about 180 grit).

Figure 3:
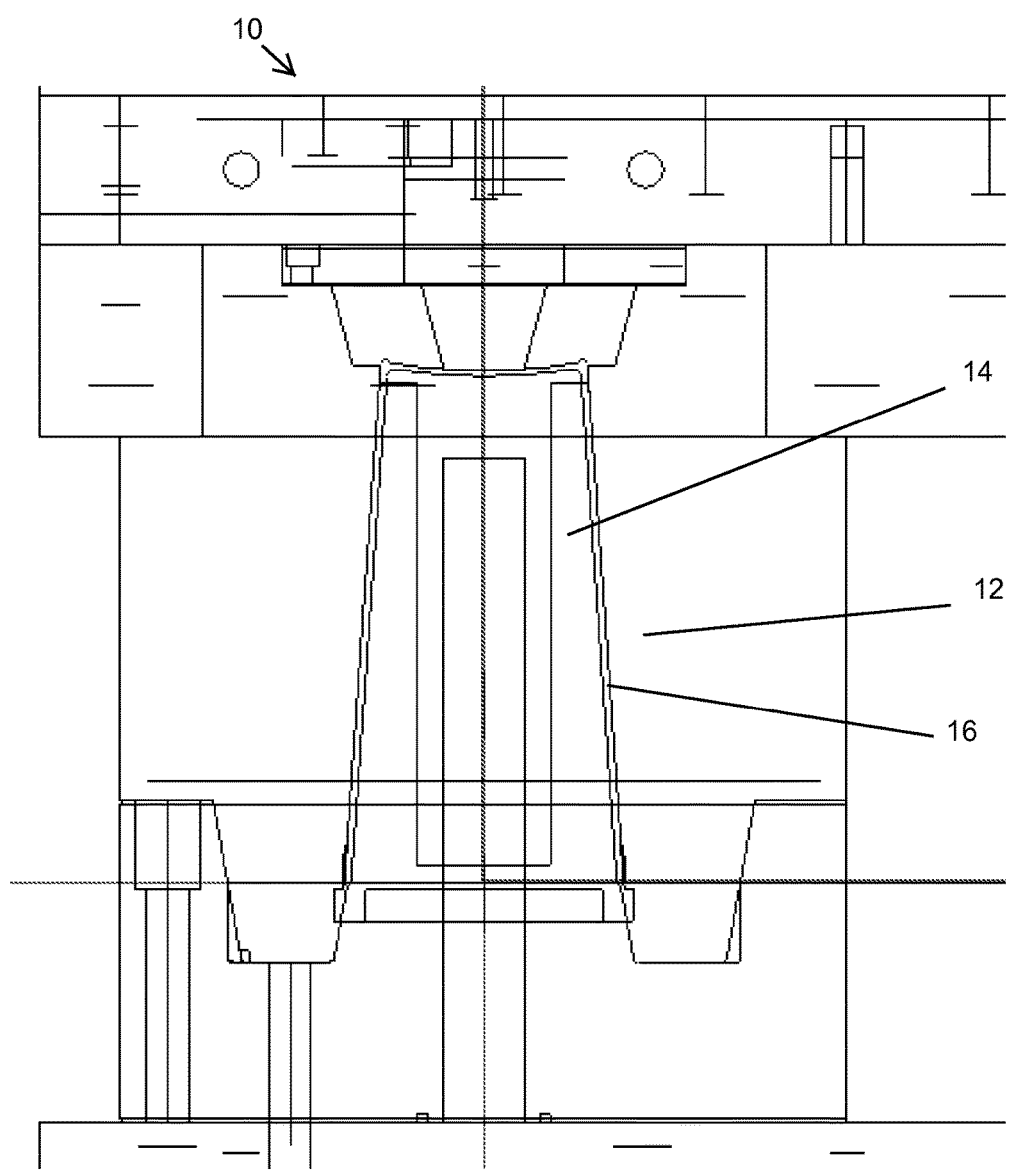
FIG. 3 is a front view of the components of FIGS. 1-2 in a manufacturing apparatus.

The portion of core component 14 that will mold the interior surface of the plastic good is preferably polished to a substantially smooth texture. The mold is disposed into a manufacturing apparatus for forming the plastic goods. FIG. 3 shows an example of mold 10 comprising core component 14 and cavity component 12. In one embodiment, the manufacturing apparatus is preferably robotic. In one embodiment, the mold is preferably cooled to below about 90° F., more preferably cooled to about 40-75° F., and even more preferably to about 55° F. In a different embodiment, the mold is maintained preferably between approximately 85° F. and approximately 115° F., more preferably between approximately 90° F. and approximately 110° F., and even more preferably between approximately 95° F. and approximately 105° F.

Figure 5:
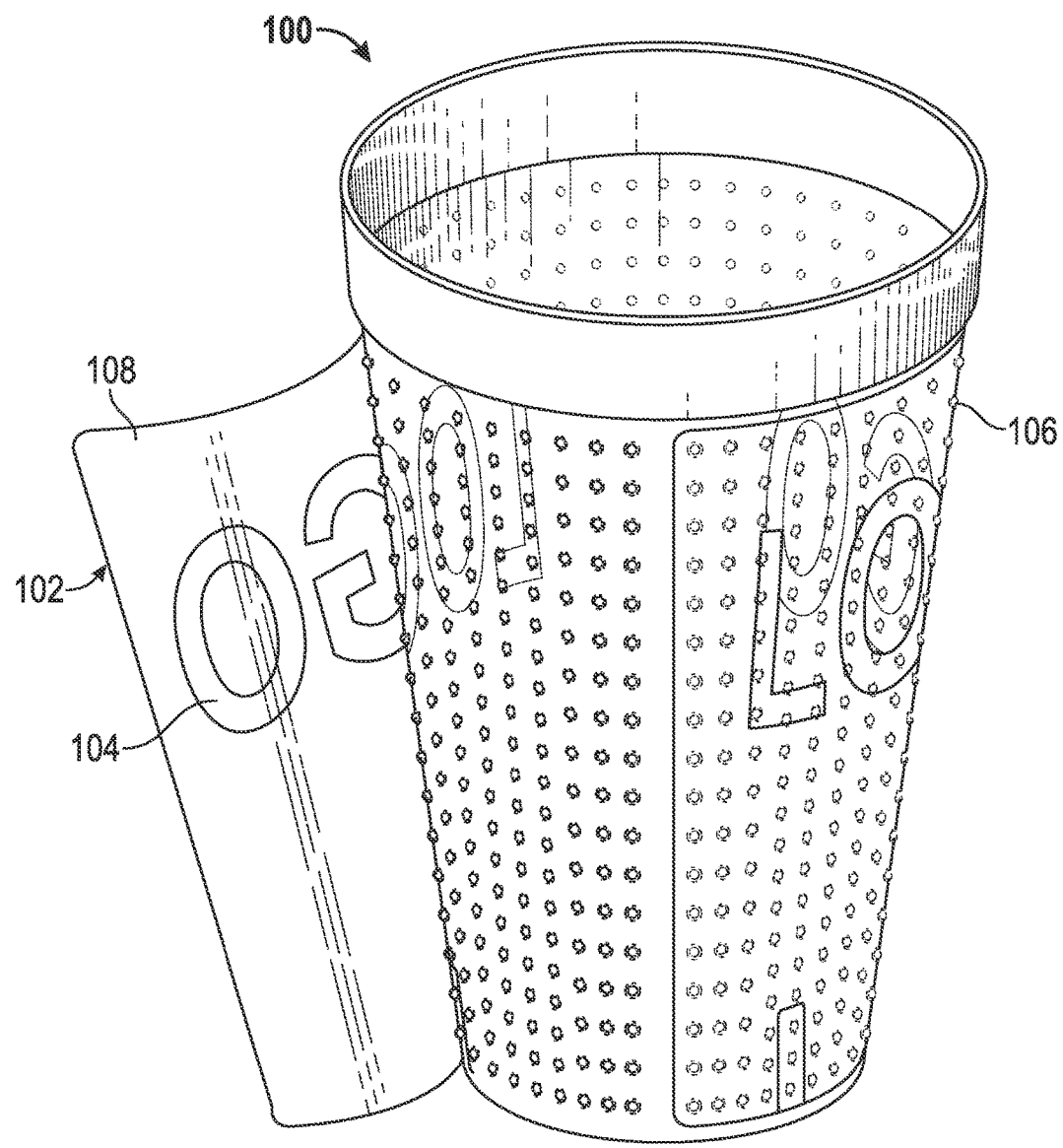
FIG. 5 is a perspective view of the plastic good of FIG. 1 showing the clear acrylic label being peeled off with art work reversed printed on its inner surface.

In one embodiment, a label, preferably a styrene acrylonitrile (SAN) label, is then disposed on the treated surface of the mold's cavity component, such that the label lays flat and is nested to the shape of the cavity component of the mold, which helps, for example, to prevent wrinkling of the label. In embodiments of the present invention, the label is locked in place as a result of the treatment that adds an appropriate texture to the final product. In one embodiment of the present invention, art work is preferably printed, and more preferably reversed printed, on the inner surface of the label, i.e., the side of the label facing the core of the mold, and which will be in direct contact with the plastic good (see FIG. 5). Preferably, the ink used is heat resistant. In a preferred embodiment, a plurality of labels is disposed in a magazine. The labels are preferably robotically placed in the cavity of the mold one at a time by the manufacturing apparatus for each plastic good molded. The label prevents melted plastic within gap 16 from contacting the outer surface of the label. Further, the label is preferably die cut and is preferably cut slightly longer than the length of the plastic good to allow the label to be pushed into a correct position on the finished plastic good. Label positioning on the treated surface of cavity component 12 is not critical because the mold is preferably designed to push the label to the bottom of the finished plastic good, thus aligning the label with bottom of the finished plastic good.

A predetermined amount of plastic, such as pellets, is melted in the manufacturing apparatus, typically at about 430-450° F., to form a liquid. The liquid is then injected into gap 16 of the cooled and solidifies, thus forming the plastic good. The label and ink (if on the inside surface of the label) are incorporated into the plastic good. Thus, the label is not applied as a separate surface feature comprising a dissimilar material. See, for example, the finished and labeled plastic good as shown in FIG. 4.

Figure 4:
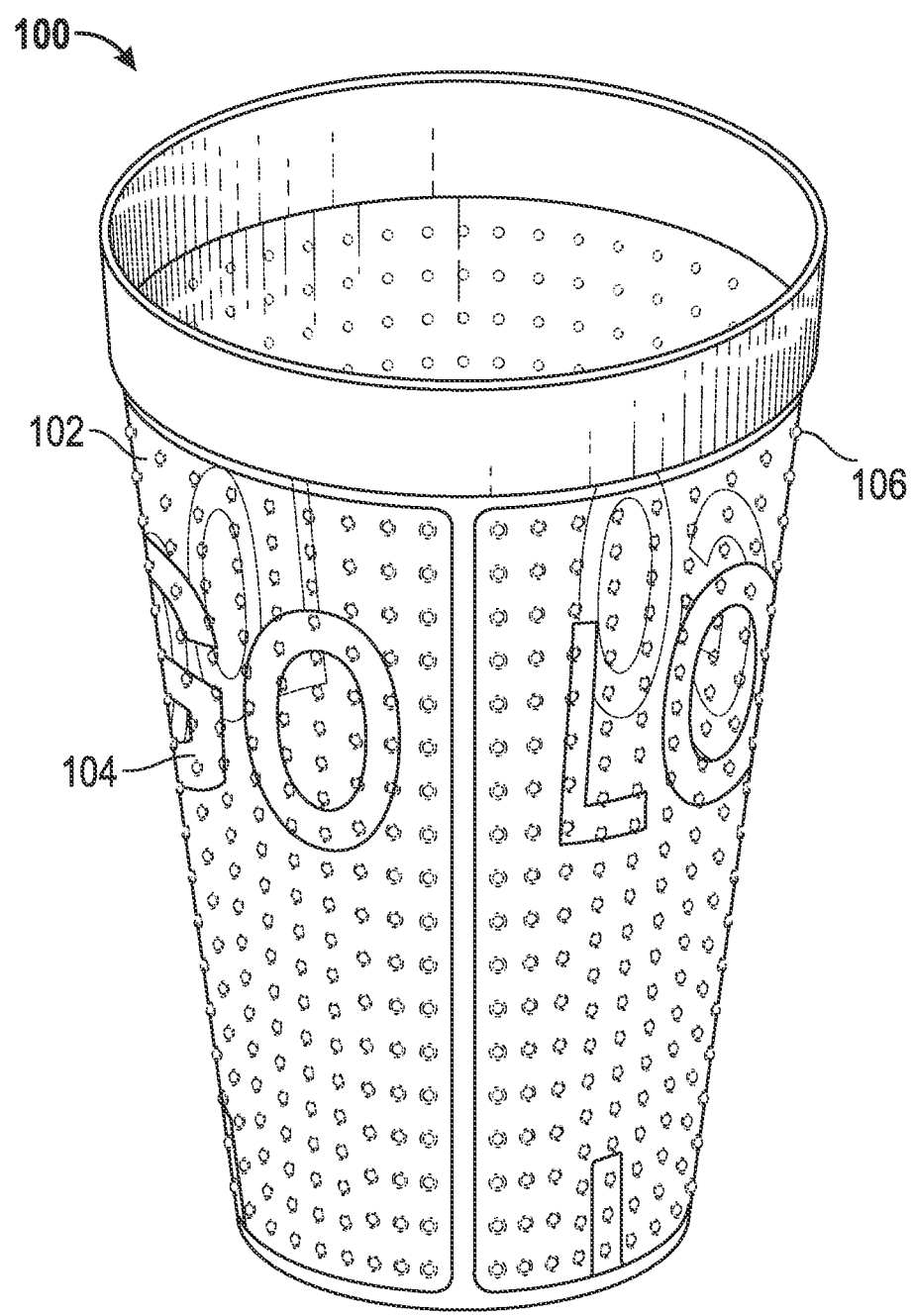
FIG. 4 is a perspective view of a finished, transparent plastic good comprising a clear acrylic label with art work manufactured through an embodiment of the present invention.

Referring to FIG. 4, transparent plastic good 100 is shown comprising clear label 102, art work 104, and multiple texture bumps 106. A manufacturing method embodiment of the present invention results in a label that is preferably a permanent part of the finished plastic good and cannot be scratched off the plastic good as with conventional labels. For illustration purposes only, the label in plastic good 100 is shown peeled off in FIG. 5, where inner surface of label 108 is shown comprising art work 104. As can be appreciated in FIG. 5, art work 104 is preferably reverse printed. Texture bumps 106 are molded into the plastic of plastic good 100 and are preferably in direct contact with the ink of art work 104. Thus, the label itself protects the art work once the plastic good is finished.

Preferably, the added texture protects the label since protrusions on the outer surface of the plastic good isolate, in part, the label from scratching and other physical challenges. For example, texture bumps 106 in FIGS. 4-5 protrude from the outer surface of the finished plastic good. Because texture bumps 106 are the primary areas of contact with other objects or surfaces that could scratch the label, for example other cups during dish washing or stacking and shipping, etc., the object would primarily scratch the part of the label covering texture bumps 106, leaving most of the label intact. In addition added texture improves the aesthetic appearance of the finished plastic good. For example, texture bumps 106 may resemble bubbles of carbonated drinks.

Figure 6:
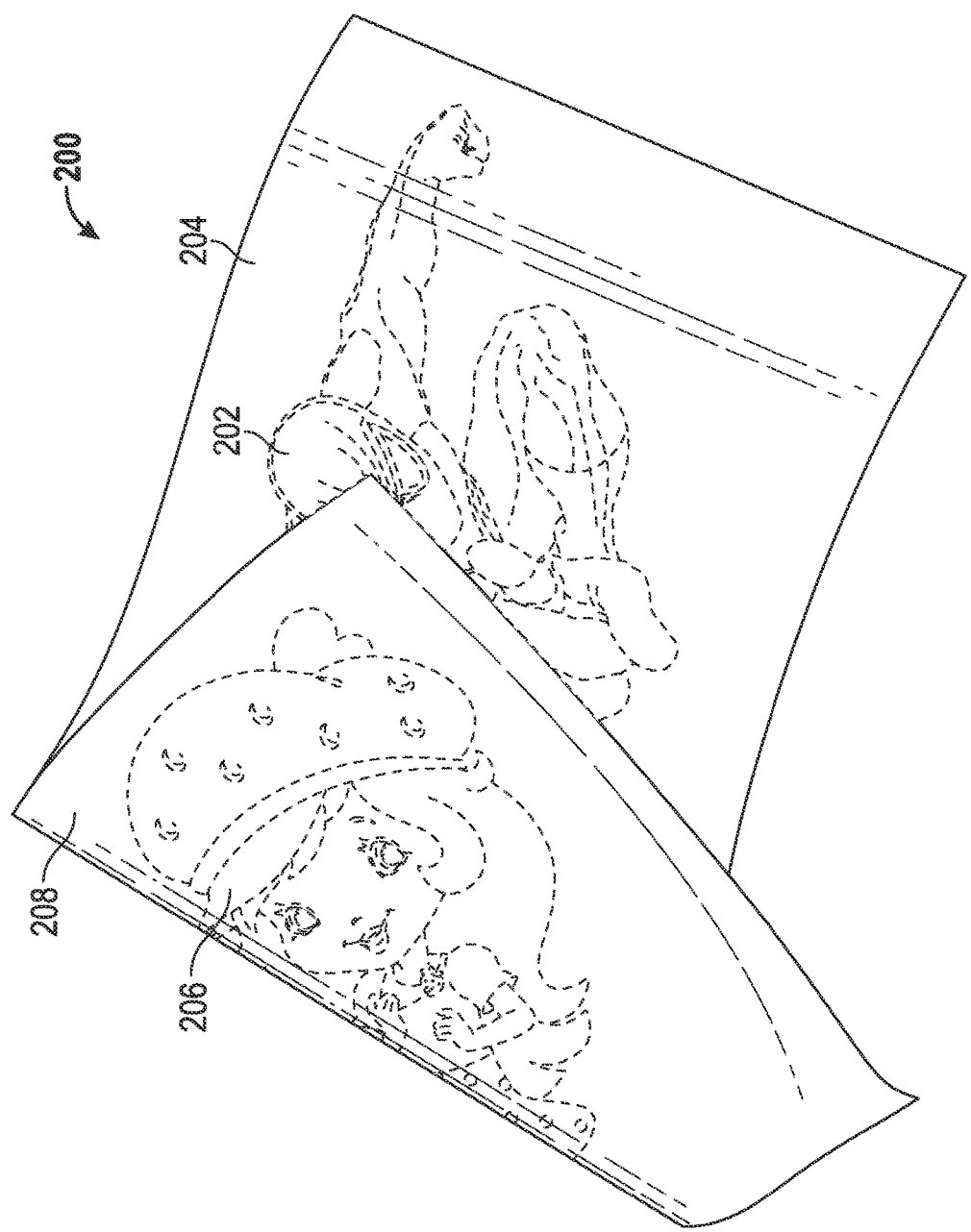
FIG. 6 is a perspective view of a label showing art work on its outer surface and inner surface.
Figure 7:
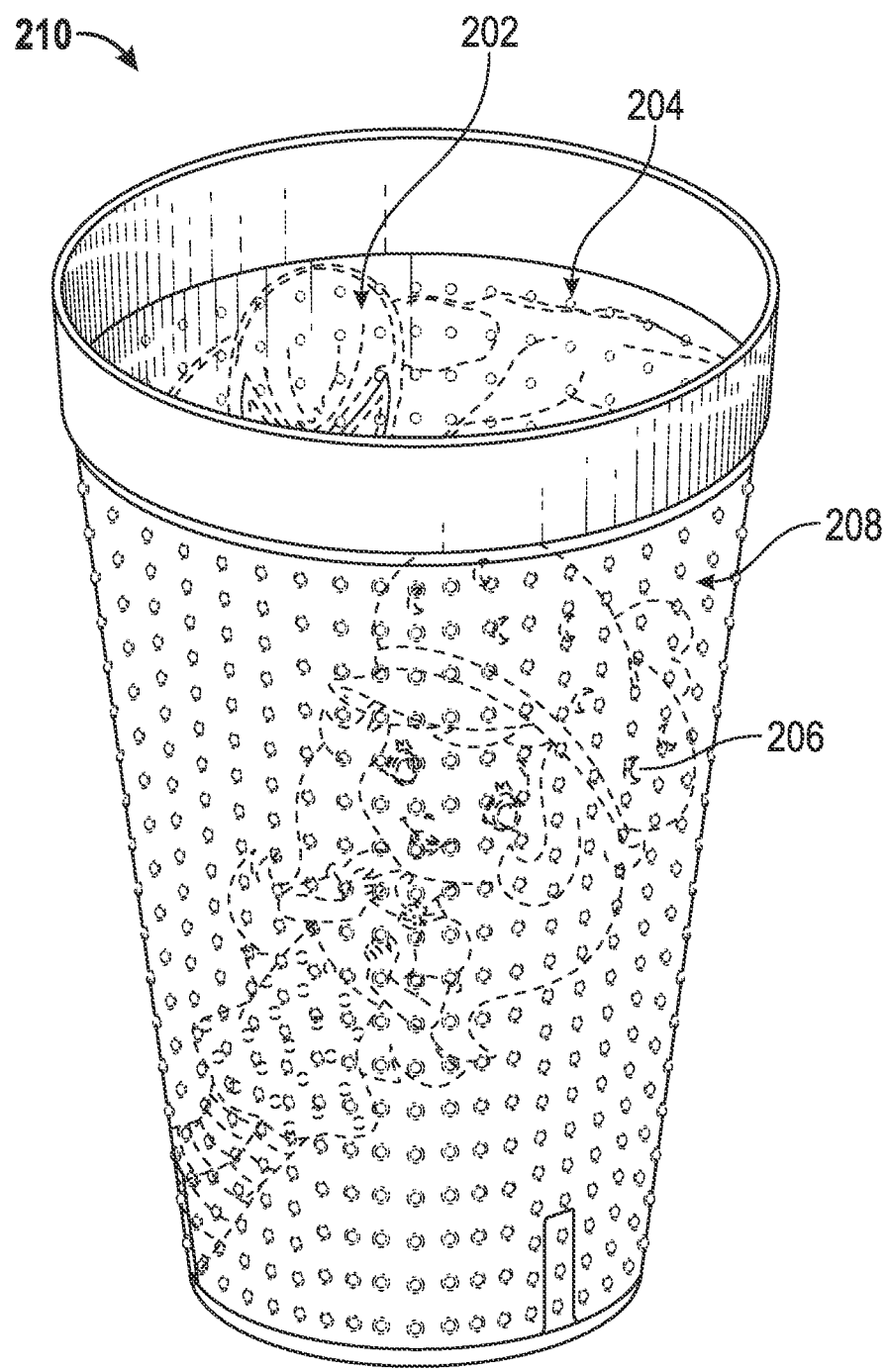
FIG. 7 is a perspective view of a finished plastic good manufactured according to an embodiment of the present invention showing the label of FIG. 6.

Referring to FIGS. 6 and 7, in a different embodiment of the present invention, opaque label 200 is used comprising art work 202 printed on its inside surface 204. The label is preferably used in manufacturing plastic goods comprising plastic that is clear or substantially transparent such that art work 202 can be viewed through the inside of the plastic good. In this embodiment, reverse printing is not necessary. Optionally, additional art work 206 is printed on the outer side 208 of label 200. FIG. 7 shows plastic good 210 comprising clear plastic with label 200 integrated onto its outer surface.

In a different embodiment, a clear label comprises art work printed on its inside surface that is reverse printed (for viewing and/or reading on the outer surface of the plastic good), and further comprises art work printed straight (for viewing and/or reading on the inner surface of a clear plastic good). This can be accomplished, for example, by first printing on a the inside of a clear label the art work that has to be reverse printed, and then printing the art work that has to be printed straight. The straight printing can be done on top of the reverse printed art work if needed. Thus, the ink for all the art work is protected by the outer surface of the label.

Figure 8:
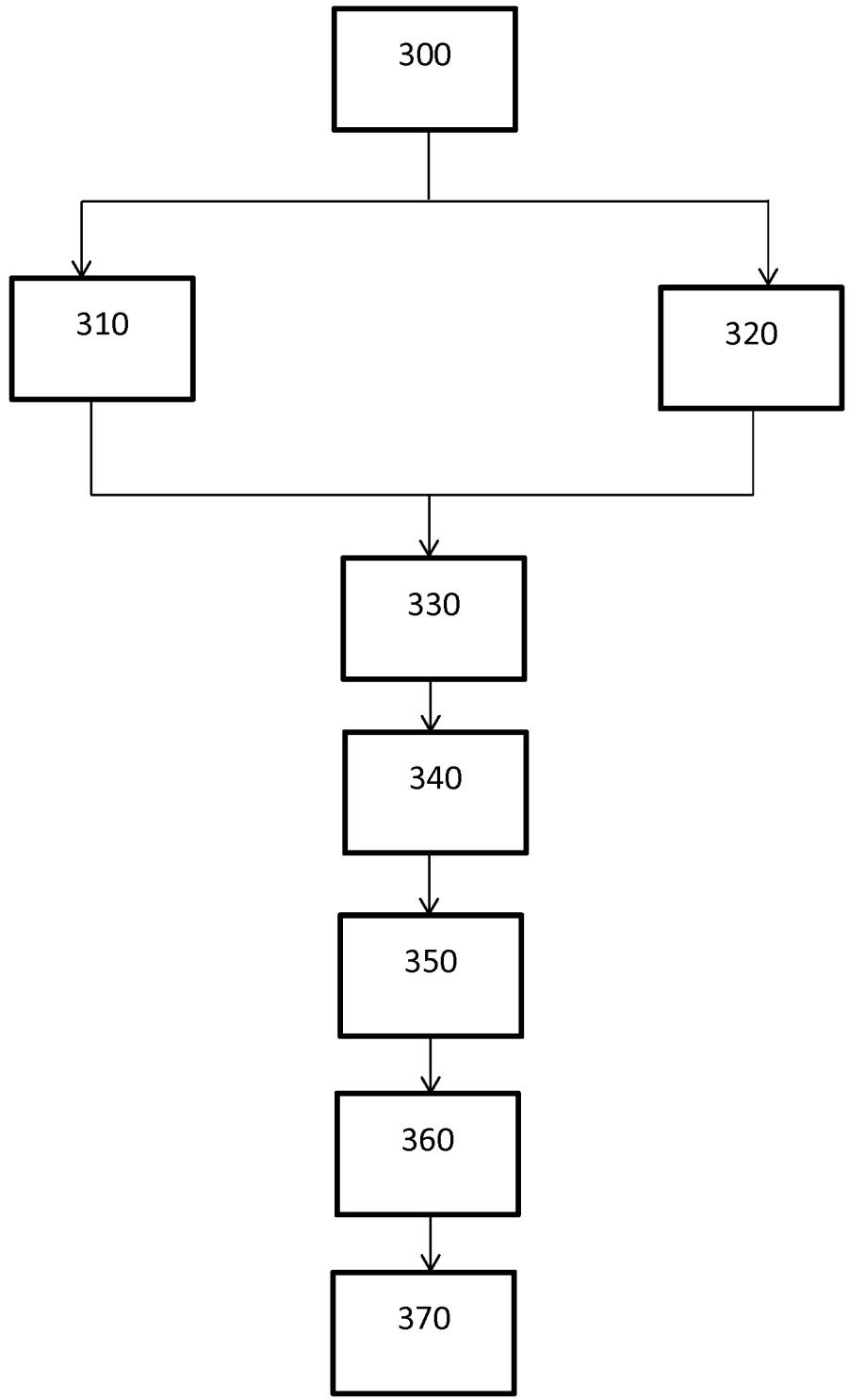
FIG. 8 is a flowchart of a method of an embodiment of the present invention.

Referring to FIG. 8, one embodiment of the present invention comprises a method of manufacturing and labeling a plastic good comprising:

Specifying, designing and building a mold according to predetermined specifications 300;

Treating a cavity of the mold to add appropriate texture to the cavity 310 and polishing the core of the mold so that it is substantially smooth 320;

Disposing the mold in an apparatus for manufacturing a plastic good 330;

Disposing a label in the cavity of the mold 340;

Injecting a predetermined amount of melted plastic pellets into the mold to form a plastic good 350;

Solidifying the plastic to form the plastic good, thereby incorporating the label into the plastic good 360; and Removing the finished, labeled plastic good from the apparatus 370.

INDUSTRIAL APPLICABILITY

The invention is further illustrated by the following non-limiting example.

Example 1

A clear plastic cup was manufactured by designing a cavity component of a mold that was acid edged and sandblasted to create dimples on its inside surface (i.e., the surface that shaped the outer surface of the cup), such that the cup, once finished had small bumps. The outer surface of a core component of the mold was polished to make it smooth so that the inside surface of the cup, once the cup was molded, was smooth. When these two components were put together, a gap with the shape of the plastic cup was created in which melted plastic could be injected to mold the cup. The mold comprising these two components was disposed in an automated apparatus for manufacturing plastic goods. Clear styrene acrylonitrile (SAN) labels comprising artwork reversed printed on the labels inside surface were placed, one at a time, on the inside surface of the cavity component that was textured, such that the dimples texture increased friction and held the label in place. The temperature of the mold was maintained at 100° F. during manufacturing. Clear plastic pellets were melted and the melted plastic was injected into the area of the gap between the polished outer surface of the core component and the label. The cup was allowed to cool so that the clear plastic could solidify. The cup was then removed from the mold. When finished, the cup's outer surface comprised the clear label and small bumps. The bumps protected the label and the label protected the art work that was printed on the inside surface of the label.

The preceding example can be repeated with similar success by substituting the generically or specifically described reactants and/or operating conditions of this invention for those used in the preceding example.

Note that in the specification and claims, "about" or "approximately" means within twenty percent (20%) of the numerical amount cited. Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A method of manufacturing and labeling plastic wares comprising:

providing a mold comprising a cavity component and a core component, wherein the cavity component has been subjected to treatment so that plastic wares formed in the mold have a plurality of protrusions extending from the outer surface of the plastic ware;

disposing a label in a gap between the cavity component and the core component so that the label is disposed against an inside surface of the cavity component;

injecting melted plastic into the gap between the core component and the label;

solidifying the melted plastic to form the plastic ware, so that the label is incorporated into the outer surface of the plastic ware and protrudes away from the outer surface of the label at the protrusions.

2. The method of manufacturing and labeling plastic wares of claim 1 wherein the treatment comprises acid etching.

3. The method of manufacturing and labeling plastic wares of claim 1 wherein the treatment comprises sandblasting.

4. The method of manufacturing and labeling plastic wares of claim 1 wherein the protrusions comprises bumps on the outer surface of the plastic ware.

5. The method of manufacturing and labeling plastic wares of claim 4 wherein the bumps are about 1 mm in diameter and are about 5 mm apart from each other.

6. The method of manufacturing and labeling plastic wares of claim 1 wherein the outside surface of the core component has been subjected to polishing.

7. The method of manufacturing and labeling plastic wares of claim 6 wherein the step of injecting comprises melting plastic pellets to create the melted plastic.

8. The method of manufacturing and labeling plastic wares of claim 1 further comprising printing art work on the inside surface of the label so that ink comprising the art work is in direct contact with the plastic.

9. The method of manufacturing and labeling plastic wares of claim 8 wherein the printing step comprises reverse printing.

10. The method of manufacturing and labeling plastic wares of claim 8 wherein the ink is heat resistant.

11. The method of manufacturing and labeling plastic wares of claim 1 wherein the label is clear.

12. The method of manufacturing and labeling plastic wares of claim 7 further comprising printing art work on the outer surface of the label.

13. The method of manufacturing and labeling plastic wares of claim 1 wherein the plastic is clear or transparent when the plastic wares are finished.

14. The method of manufacturing and labeling plastic wares of claim 11 further comprising straight printing art work on an inside surface of the label.

15. The method of manufacturing and labeling plastic wares of claim 1 further includes the step of cooling the mold prior to the injecting step.

\* \* \* \* \*